(12) United States Patent
Dagan et al.

(10) Patent No.: US 10,860,869 B2
(45) Date of Patent: Dec. 8, 2020

(54) TIME TO COLLISION USING A CAMERA

(71) Applicants: Erez Dagan, Tel Aviv (IL); MOBILEYE VISION TECHNOLOGIES LTD., Jerusalem (IL)

(72) Inventors: Erez Dagan, Tel Aviv (IL); Noam Kahlon, Rehovot (IL); Michael Latowicki, Hod Hasharon (IL); Gideon Stein, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 1339 days.

(21) Appl. No.: 14/378,798

(22) PCT Filed: Feb. 13, 2013

(86) PCT No.: PCT/IB2013/051166
§ 371 (c)(1),
(2) Date: Aug. 14, 2014

(87) PCT Pub. No.: WO2013/121357
PCT Pub. Date: Aug. 22, 2013

(65) Prior Publication Data
US 2015/0085119 A1    Mar. 26, 2015

Related U.S. Application Data

(60) Provisional application No. 61/598,916, filed on Feb. 15, 2012.

(51) Int. Cl.
*H04N 7/18* (2006.01)
*G06K 9/00* (2006.01)
*G06T 7/20* (2017.01)

(52) U.S. Cl.
CPC ........... *G06K 9/00805* (2013.01); *G06T 7/20* (2013.01); *G06T 2207/10016* (2013.01);
(Continued)

(58) Field of Classification Search
CPC ........................................................ G08G 1/16
(Continued)

(56) References Cited

U.S. PATENT DOCUMENTS

2007/0152803 A1* 7/2007 Huang ................... B60Q 1/525
340/435
2008/0046181 A1* 2/2008 Koike ................ G06K 9/00805
701/301
(Continued)

FOREIGN PATENT DOCUMENTS

EP    1837803 A2    9/2007

OTHER PUBLICATIONS

International Search Report and Written Opinion in corresponding International Application No. PCT/IB2013/051166.

*Primary Examiner* — Girumsew Wendmagegn
(74) *Attorney, Agent, or Firm* — Finnegan, Henderson, Farabow, Garrett & Dunner, L.L.P.

(57) ABSTRACT

Computing a time-to-contact (TTC) of a vehicle with an object. The object includes a light source. The system mountable in the vehicle includes a camera and a processor configured to capture images of the object. The processor is operable to track a spot between the images to produce a tracked spot. The spot includes an image of the light source. The processor is operable to compute time-to-contact (TTC) responsive to changes in brightness of the tracked spot.

16 Claims, 10 Drawing Sheets

(52) U.S. Cl.
CPC .............. *G06T 2207/10021* (2013.01); *G06T 2207/30252* (2013.01); *G06T 2207/30261* (2013.01)

(58) Field of Classification Search
USPC ........................................................ 348/148
See application file for complete search history.

(56) References Cited

U.S. PATENT DOCUMENTS

2010/0172542 A1* 7/2010 Stein .................. G06K 9/00798
382/103
2012/0287276 A1* 11/2012 Dwivedi ............ G06K 9/00825
348/148

* cited by examiner

TTC (seconds)

TIME TO COLLISION USING A CAMERA

BACKGROUND

1. Technical Field

The present invention relates to driver assistance systems and in particular to collision warning systems

2. Description of Related Art

During the last few years camera based driver assistance systems (DAS) have been entering the market; including lane departure warning (LDW), Automatic High-beam Control (AHC), pedestrian recognition, and forward collision warning (FCW).

A core technology behind conventional forward collision warning (FCW) camera based driver assistance systems and headway distance monitoring is vehicle detection in the image frames. Assume that reliable detection of vehicles in a single image a typical forward collision warning (FCW) system requires that a vehicle image be 13 pixels wide, then for a car of width 1.6 m, a typical camera gives initial detection at 115 m and multi-frame approval at 100 m. A narrower horizontal field of view (FOV) for the camera gives a greater detection range however; the narrower horizontal field of view (FOV) will reduce the ability to detect passing and cutting-in vehicles. A horizontal field of view (FOV) of around 40 degrees was found by Mobileye (to be almost optimal (in road tests conducted with a camera) given the image sensor resolution and dimensions. A key component of a conventional forward collision warning (FCW) algorithm is the estimation of distance from a camera and the estimation of time-to-contact/collision (TTC) from the scale change. as disclosed for example in U.S. Pat. No. 7,113,867.

BRIEF SUMMARY

Various methods are provided herein for computing a time-to-contact (TTC) of a vehicle with an object. The object includes a light source. The method is performable by a camera connectible to a processor. Multiple images of the object are captured. A spot, including an image of the light source is tracked between the images and a tracked spot is produced. Time-to-contact is computed responsive to change in brightness of the tracked spot. The time-to-contact may be computed from energy of the spot in the image. The energy may be computed by summing pixel values from a multiple pixels of the spot. The time-to-contact may be computed from change in the energy over time. A function of the energy may be fit to a function of the time-to-contact. The reciprocal of the square root of the energy may be fit to a linear function of the time-to-contact. It may be determined whether the vehicle and the object are on a collision course responsive to image motion of the tracked spot.

Various systems are provided herein for computing a time-to-contact (TTC) of a vehicle with an object. The object includes a light source. The system mountable in the vehicle includes a camera and a processor configured to capture the camera a plurality of images of the object. The processor is operable to track a spot between the images to produce a tracked spot. The spot includes an image of the light source. The processor is operable to compute time-to-contact (TTC) responsive to changes in brightness of the tracked spot. The time-to-contact may be computed from energy of the spot in the image. The energy may be computed by summing pixel values from multiple pixels of the spot. The time-to-contact may be computed from change in the energy over time. A function of the energy may be fit to a function of the time-to-contact. The camera may be a camera from a stereo pair of cameras. The time-to-contact may computed from a sensor input to the processor from a combination of the camera with a radar system. The time-to-contact may be computed from a sensor input provided to the processor from a combination of the camera with a lidar system.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein:

FIG. 8b shows a plot of energy (e) as a function of frame number, where time-to-contact (TTC) is computed for the spot from the taillight of the lead vehicle of FIG. 8a.

DETAILED DESCRIPTION

Figure 1:
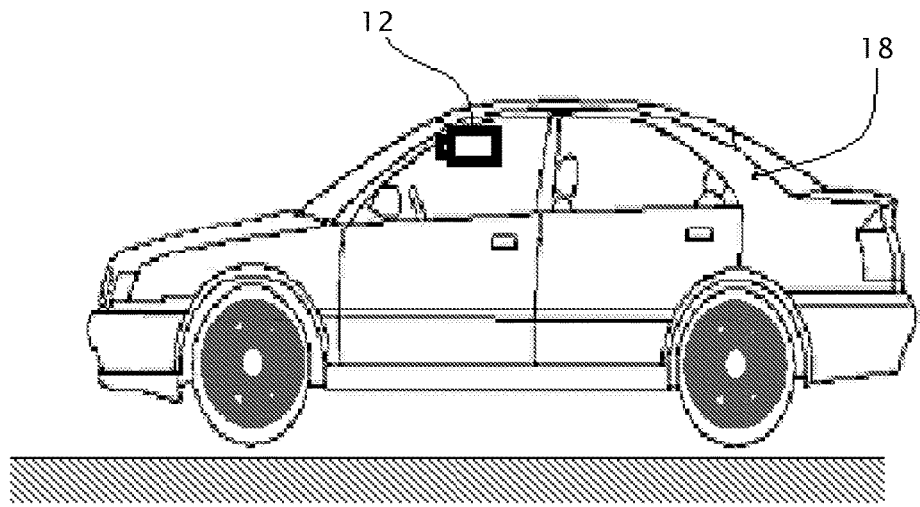
FIGS. 1 and 2 illustrate a system including a camera or image sensor mounted in a vehicle, according to an aspect of the present invention.

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

By way of introduction, features of the present invention are directed to an accurate computation of time-to-contact (TTC) with an object. The accurate computation of time-to-contact (TTC) may be used to provide a warning to a driver of a vehicle to prevent a collision with the object. The object may be a light source such as a taillight of a lead vehicle or a headlight of an oncoming vehicle, for example. The accurate computation may be derived from the changes in brightness of a tracked spot of the light source in an image or multiple images acquired in a forward view of the vehicle. The accurate computation may be used among other applications, for forward collision warning (FCW) and/or collision mitigation by braking (CMbB).

Figure 2:
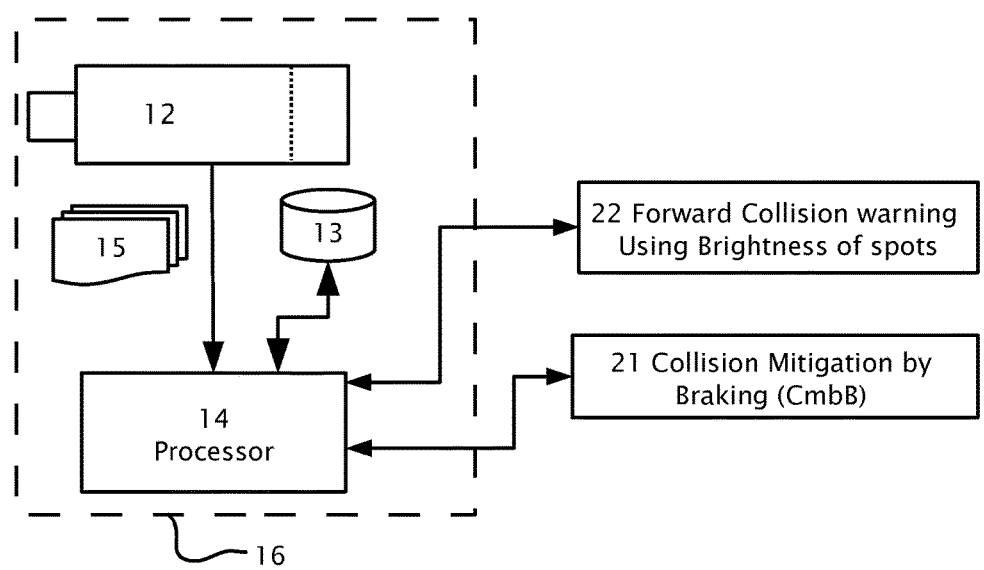

Reference is now made to FIGS. 1 and 2 which illustrate a system 16 including a camera or image sensor 12 mounted in a vehicle 18, according to an aspect of the present invention. Image sensor 12, imaging a field of view in the forward direction provides image frames 15 in real time and image frames 15 are captured by processor 14. Processor 14 may be used to process image frames 15 simultaneously and/or in parallel to serve a number of driver assistance systems/applications including: forward collision warning, automatic headlight control, traffic sign recognition etc. The driver assistance systems may be implemented using specific hardware circuitry with on board software and/or software control algorithms in memory or storage 13. Image sensor 12 may be monochrome or black-white, i.e. without color separation or image sensor 12 may be color sensitive. By way of example in FIG. 2, image frames 15 are used to serve and forward collision warning 22 using spot brightness and/or collision mitigation by braking 20 based on spot brightness, according to different aspects of the present invention.

Although embodiments of the present invention are presented in the context of driver assistance applications, embodiments of the present invention may be equally applicable in other real time vision processing applications such as machine vision.

Figure 3:
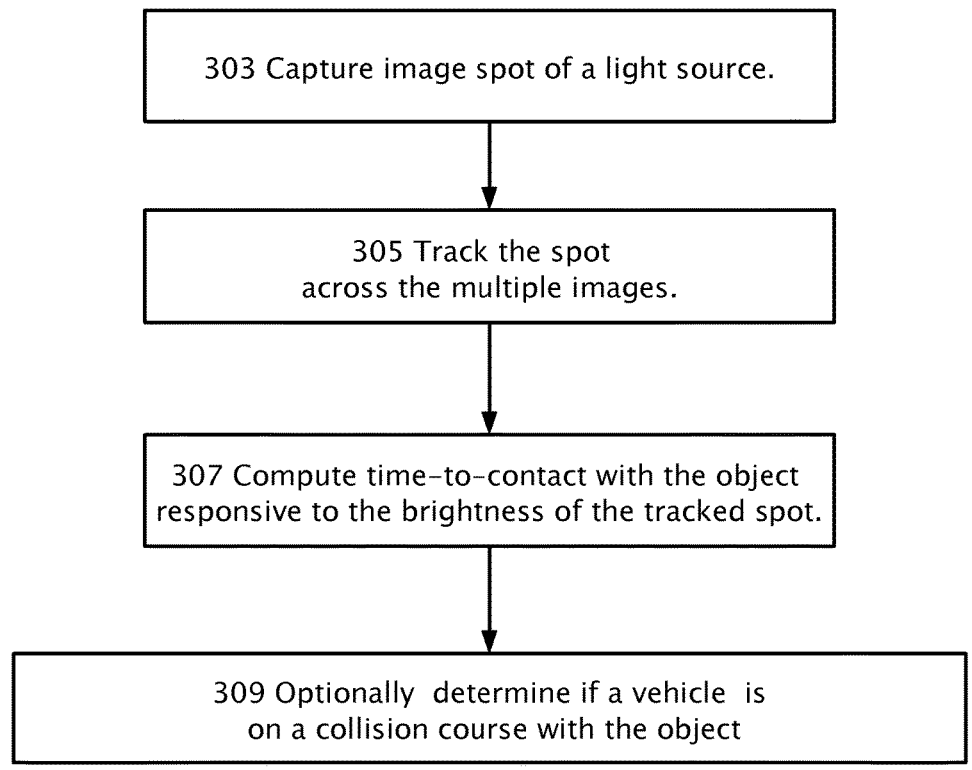
FIG. 3 shows a flowchart of a method, according to features of the present invention.
Figure 4:
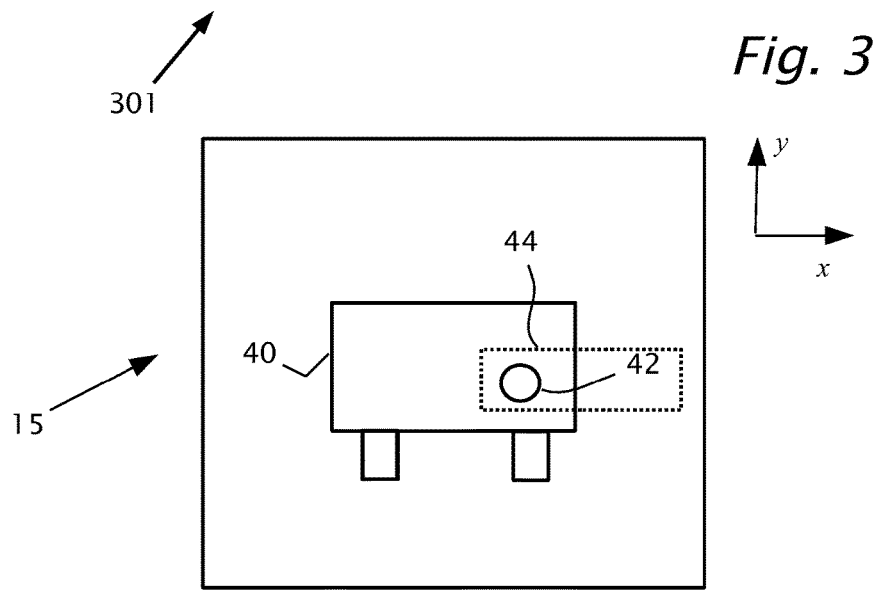
FIG. 4 shows schematically an image frame, according to a feature of the present invention.

Reference is now made to FIG. 3 which shows a flowchart of a method 301, according to features of the present invention. Method 301 computes a time-to-contact (TTC) of a vehicle 18 with an object. The object may be a taillight of a lead vehicle, a headlight of an oncoming vehicle or other light source. Reference is also made to FIG. 4 which shows schematically features of an image frame 15, by way of example according to an aspect of the present invention. In the example of FIG. 4, image frame 15 includes a lead vehicle 40 with a spot 42 from one of the taillights of vehicle 40

If t' is the expected contact time with the object, e.g. lead vehicle 40, and time t is current time, then time-to-contact (TTC) between vehicle 18 and the object is the time interval between current time t and the expected contact time t' and may be given by equation 1.

$$TTC = t' - t \qquad (1)$$

Distance Z to the object is given by equation 2

$$Z = V_{rel} * TTC \qquad (2)$$

where $V_{rel}$ is the relative speed between vehicle 18 and lead vehicle 40, assuming constant relative speed.

The measured energy (e) of a taillight of in image sensor 12 may be given in equation 3, where K is some constant.

$$e * K = \frac{1}{Z^2} \qquad (3)$$

Combining equations 1-3 above gives:

$$t = \frac{1}{\sqrt{e} * A} + t'; \qquad (4)$$

for some constant A. Time-to-contact TTC may be estimated according to the square root of spot energy e (or brightness).

Referring now to FIG. 3, image frames 15 are captured (step 303) by image sensor 12 at known time intervals with a certain exposure. Spot 42 is tracked (step 305) across multiple image frames 15. In step 307, a time-to-contact between host vehicle 18 and lead vehicle 40 may be computed for the tracked spot 42 between pairs of image frames 15, according to features of the present invention as described below. In step 309, it may be determined if lead vehicle 40 and/or the light source is on a collision course with host vehicle 18.

With reference to the equations above and FIG. 4, time-to-contact (TTC) step 307 may be calculated in the following manner:

1. A small rectangular neighborhood 44 around spot 42 may be selected for instance using the shortest exposure for image sensor 12.
2. A threshold value may be estimated to separate spot 42 from its background bounded by rectangular neighborhood 44. The threshold value is a gray-scale value darker than spot 42 and brighter than the background of spot 42. The histogram of rectangular neighborhood 44 has a bimodal distribution. The threshold gray-scale value may be selected between the two modes of the histogram.
3. The values for all the pixels above the separating threshold may be summed.
4. Optional: Spot 42 may be checked for connectedness so that two close spots 42 are not combined.

In practice, a dynamic threshold for computing the energy of spot 42 performs better than a fixed threshold such as the fixed threshold used to first detect spot 42.

If pixels in spot 42 are saturated, the saturated pixels do not contribute correctly to an energy estimation of spot 42. Saturated pixels may be avoided in a number of ways such as by use of:

1. Newer high dynamic range (HDR) cameras which do not get saturated from taillights.
2. Additional shorter exposures with older (linear) sensors, may be used.
3. In a predictive spot model, the non-saturated pixels at the edge of the spot 42 can be used to predict the true spot intensity in the center of spot 42. The true spot intensity in the center of spot 42 function may be learned from multiple examples using for instance machine learning techniques such as support vector machines (SVMs).

Calculation of Constant A and Time-to-contact TTC

As an example for calculating the constant A and time-to-contact TTC, the most recent 16 frames 15 may be used. For image frames 15, there are couples of energy $e_i$, $t_i$ where the index i varies between -15 and 0. All possible pairs of frames 15 may be chosen for the 16 frames. However, it was found that pairs with consecutive image frames 15 may be discarded since it was found that consecutive image frames 15 in practice may not give accurate results. For each i, j pair of selected image frames 15, the following two equations may be solved, where $T_i$, $T_j$ are time measurements and $e_i$ and $e_j$ are energy measurements for frames i and j respectively. Constant A and time offset t are estimated:

$$T_i = \frac{1}{A} * e_i^{-1/2} + t \qquad (5)$$

$$T_j = \frac{1}{A} * e_j^{-1/2} + t \qquad (6)$$

The above two equations (5) (6) are linear equations with an unknown slope A and offset t.

$T_i$ and $T_j$ are the corresponding times of the measurements where the time of image frame 15 (i=-15) is set to be zero.

Constant A may be extracted is by solving equations 5 and 6:

$$A = \frac{e_i^{-1/2} - e_j^{-1/2}}{dt} \qquad (7)$$

where dt is the difference between the time-to-contact $TTC_i$ for frame i and the time-to-contact $TTC_j$ for frame j.

When the history for spot 42 is less than sixteen image frames 15, fewer than sixteen frames may be used such as eight frames. However, calculating time-to-contact (TTC) with a history less than eight frames may not achieve sufficiently accurate results.

Multiple measurements may be combined together. Multiple measurements may be combined as weighted least squares where each measurement provides one equation to a large number of linear equations in the same variables slope A and offset time t. The equation for each measurement may be weighted according to when in time the measurements of time T and energy e are taken. It is advantageous to use robust estimation techniques. Iteratively re-weighted least squares may be used. The value of slope A may be computed as the most frequent in a distribution as follows:

Compute Constant A as Most Frequent in a Distribution

A histogram of the solutions for slopes A may be calculated using up to 50 bins from a minimum slope $A_{min}$ to a maximum slope $A_{max}$. The slopes A received from image frames 15 which are further apart in time, may receive a higher weight and contribute more to the histogram, for instance in the following manner:

Slopes from consecutive image frames 15 are discarded because the energy fluctuations usually add noise.
  Slopes from energies which are between two and seven image frames 15 apart are added once to the histogram.
  Slopes from energies which are between eight and eleven image frames 15 apart are added twice to the histogram.
  Slopes from energies which are twelve to fifteen image frames 15 apart are added three times to the histogram.

The bin with the maximal number is identified. For slope A with the maximal number, the mean offset or intercept t is calculated over the 16 data points. In the simplest form, the following equation may be solved for intercept t as a least squares.

$$T_i = \frac{1}{A} * e_i^{-1/2} + t \qquad (8)$$

The spread of intercept t values may then computed. A tighter spread means intercept t is calculated to a higher confidence.

The calculation of the mean offset t may be made more robust, by rejecting equations from image frames 15 which did not appear in any of the inlier pairs used to estimate A. It would also be possible to use the L1 norm or other known robust methods to improve the calculation of the mean offset t.

Offset t is computed in the time frame of frame i=-15. The subtraction $T_{15}-T_i$ adjusts the offset to the current $i^{th}$ image frame 15.

Multi-frame model

In the single frame (SF) model as described above, each image frame 15 and fifteen prior image frames 15 are used to compute slope A and intercept t as described above. A time-to-contact (TTC) warning could be triggered by a single frame (SF) model showing time-to-contact TTC below a threshold. However, a spot 42 is typically tracked for significantly more than 16 image frames 15 before the time-to-contact (TTC) becomes critical. Each image frame 15 typically gives a new single frame (SF) model. A multi-frame model (MF) accumulates information from the single frame models over time:

The multi-frame (MF) model may be a weighted sum of the current multi-frame (MF) and the new single frame (SF), with the models' confidences as weights (0<confidence<1)
  The single frame (SF) confidence $C_{SF}$ is lower when the standard deviation STD(A) of the histogram of A is high, and when the time-to-contact TTC range received by the different offsets is too wide or STD($t_i$) is large.

$$C_{SF} = \frac{1}{\alpha STD(A) + \beta STD(t_i) + 1} \qquad (9)$$

where $\alpha$, $\beta$ are respective weights.

The multi-frame (MF) confidence $C_{MF}$ is a combination of the current multi-frame (MF) confidence $C_{MF}$ and the new single frame (SF) confidence $C_{SF}$.

$$C_{MF} = 0.9 * C_{MF} + 0.1 * C_{SF} - \gamma |\delta TTC| \qquad (10)$$

multi-frame (MF) confidence $C_{MF}$ is lowered when the MF time-to-contact (TTC) sharply changes, shown as term $\delta TTC$ with weight $\gamma$.
  multi-frame (MF) confidence decays when there is no new single frame (SF) data.

309 Detecting Collision Course: Friend or Foe

Figure 5:
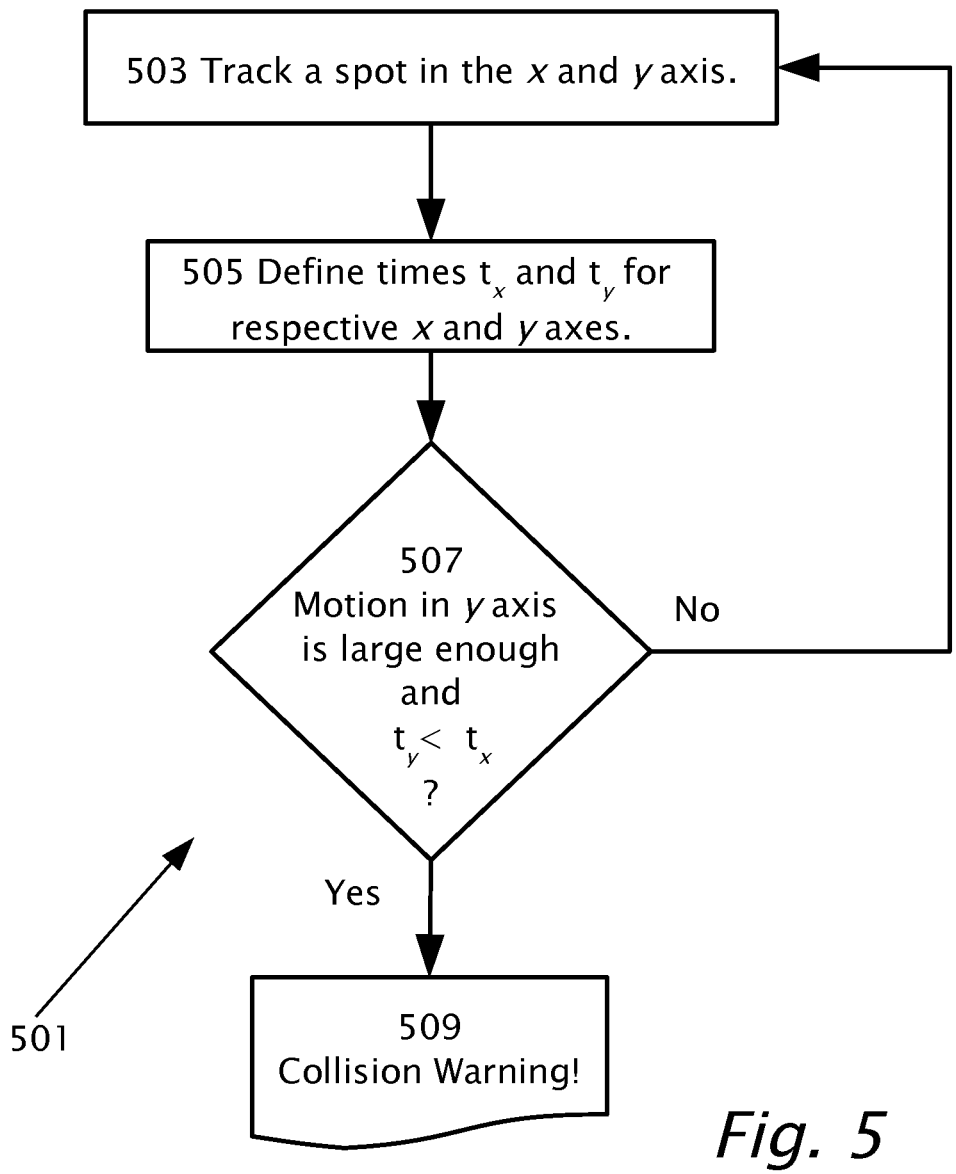
FIG. 5 illustrates a flow diagram of a method, according to a feature of the present invention.

An example is now shown for detecting collision course, step 309 of FIG. 3. Reference is now again made to FIG. 4 and to FIG. 5 which shows a flow chart of a method 501, according to a feature of the present invention. A collision course with a leading vehicle 40 may be detected. Motion of spot 42 is tracked (step 503) in image space in the horizontal axis x and the vertical axis y. Times $t_x$ and $t_y$ are then defined (step 505) as to how long will it take spot 42 to exit rectangle 44 in each axis x and y respectively. In decision 507, spot 42 is on a collision course (step 509) with lead vehicle 40 if:
  (i) the motion in y-axis is big enough, and
  (ii) time $t_y$ during which spot 42 leaves rectangle 44 vertically is less than time $t_x$ during which spot 42 leaves rectangle 44 horizontally.

Otherwise, spot 42 is not on a collision course with lead vehicle 40 and tracking of spot 42 continues with step 503.

Method 501 checks whether spot 42 is predicted to leave in the y direction through the bottom of image rectangle 44, indicating a collision; rather than spot 42 leaving the side of rectangle 44 in the x direction indicating no collision. The choice of the image dimensions for the rectangle 44 is rather arbitrary. The algorithm above can be fine-tuned by adjusting rectangle 44, assuming the target taillight of lead vehicle 40 is about the same height as the host vehicle 18 headlamp. Rectangle 44 may be adjusted as follows:
  1. Draw a line in image space that is the projection of a line in three dimensional (3d) real space that joins host vehicle 18 headlamps. Note that the projected line in image space may not fall inside image frames 15.
  2. Extend the real space line to the full width of host vehicle 18 plus any required safety margin. The projection of the extended real space line to image space is the bottom of the rectangle.
  3. Extend vertical lines from the ends of the horizontal image line to above the image of spot 42.

Steps 1-3 above may be used define the rectangle 44 in image space. Two rectangles may be defined based on the minimum and maximum expected heights of the target taillights.

Results

Collision course algorithm 501 was applied to night time pre-crash test-track scenes using spot 42 based time-to-contact (TTC) method 301, according to an embodiment of the present invention with other methods of vehicle detection and collision warning disabled.

Figure 6A:
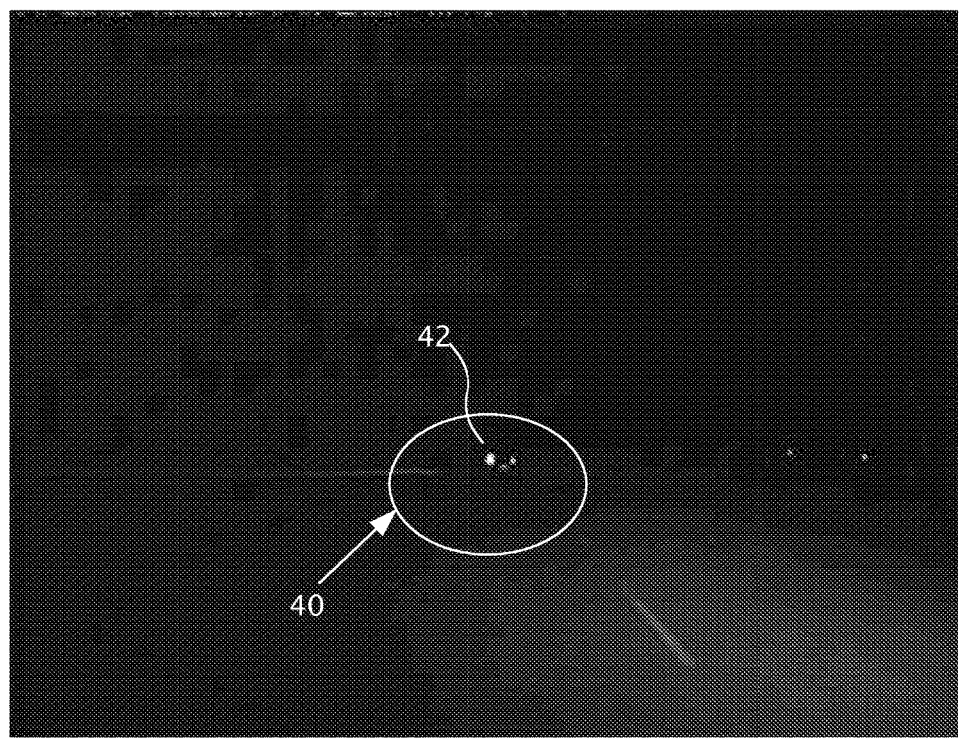
FIG. 6a shows a representative image frame of a leading vehicle at night

There were 106 relevant test cases. FIG. 6a is a representative image frame 15 for one example of a test case of a leading vehicle 40. Left spot 42 was computed which is an image of the left taillight of leading vehicle 40.

For the 106 cases, a time-to-contact (TTC) signal was generated on 81 cases (77%). where all 25 misses of threat assessment had only blinking hazard lights on but with taillights of leading vehicle 40 were off.

Figure 6B:
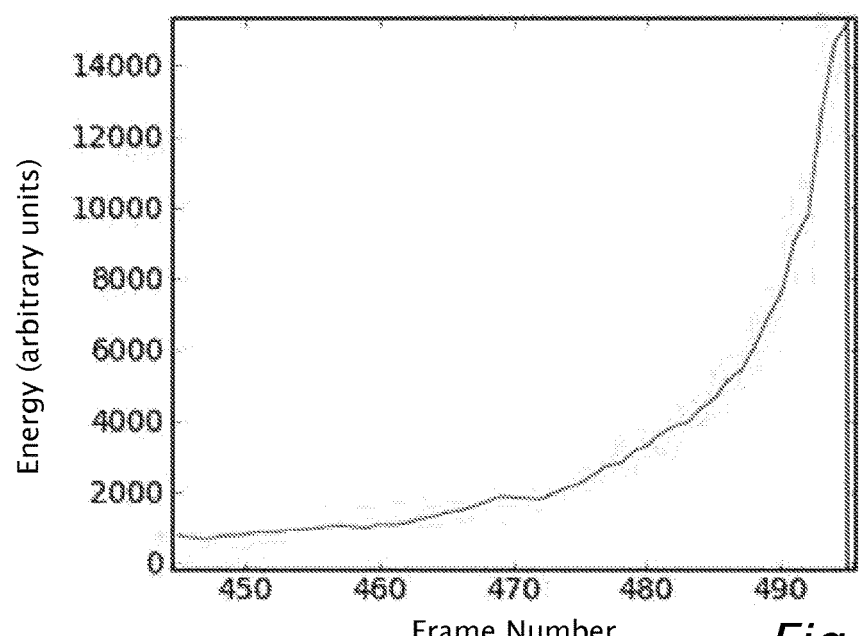
FIG. 6b shows a plot of energy (e) as a function of frame number, where time-to-contact (TTC) is computed for a spot from a taillight of a lead vehicle, according to an aspect of the present invention.
Figure 6C:
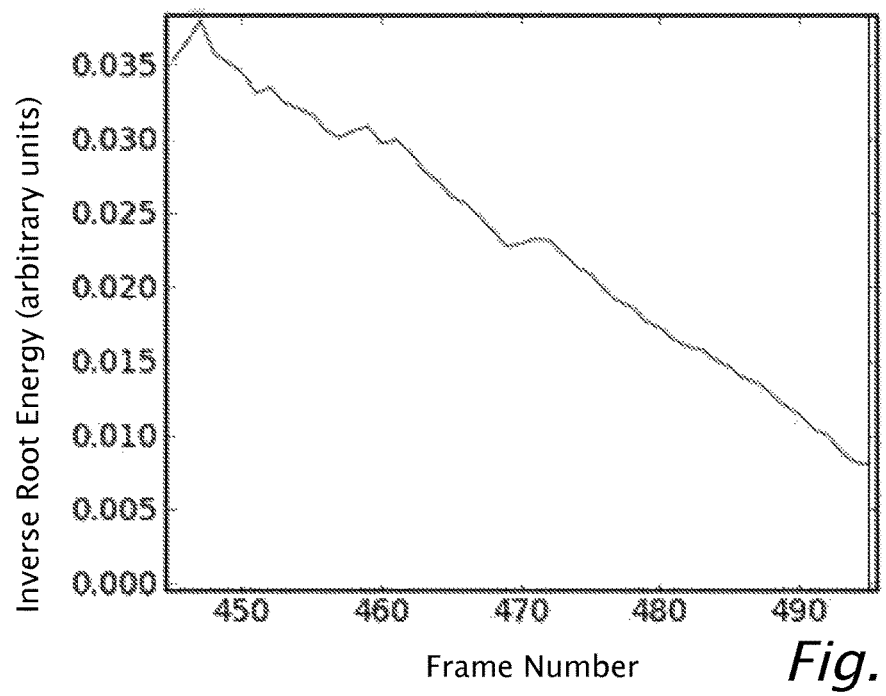
FIGS. 6c and 6d show plots of inverse of the square root of energy (e) as a function of frame number, where time-to-contact (TTC) is computed for a spot on the lead vehicle.
Figure 6D:
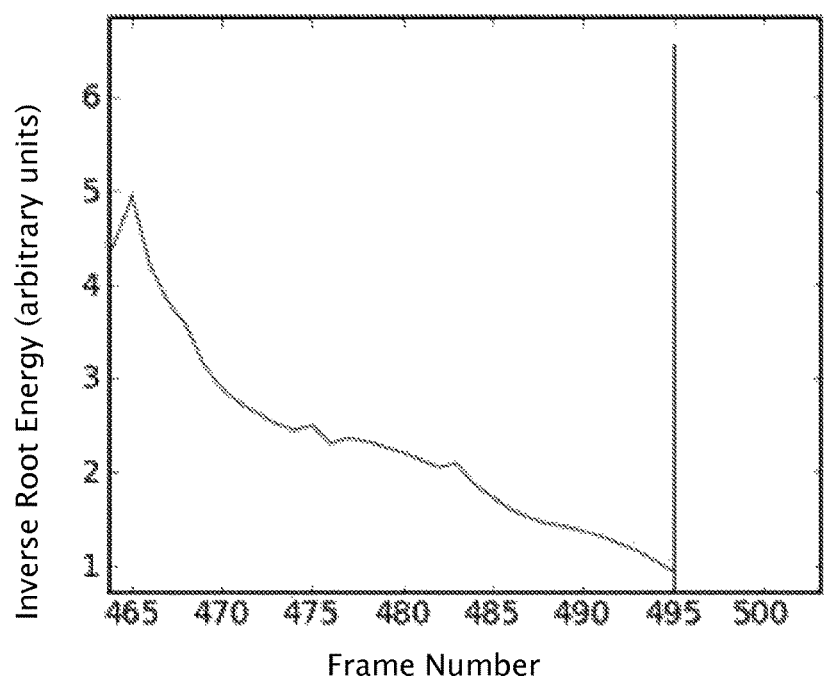

FIG. 6b shows a graph of energy (e), as a function of frame number, where time-to-contact (TTC) is computed for left spot 42 on lead vehicle 40 as shown in FIG. 6a. FIGS. 6c and 6d show graphs of the inverse of the square root of energy (e), as a function of frame number, where time-to-contact (TTC) is computed for the left spot 42 on lead vehicle 40.

Figure 7:
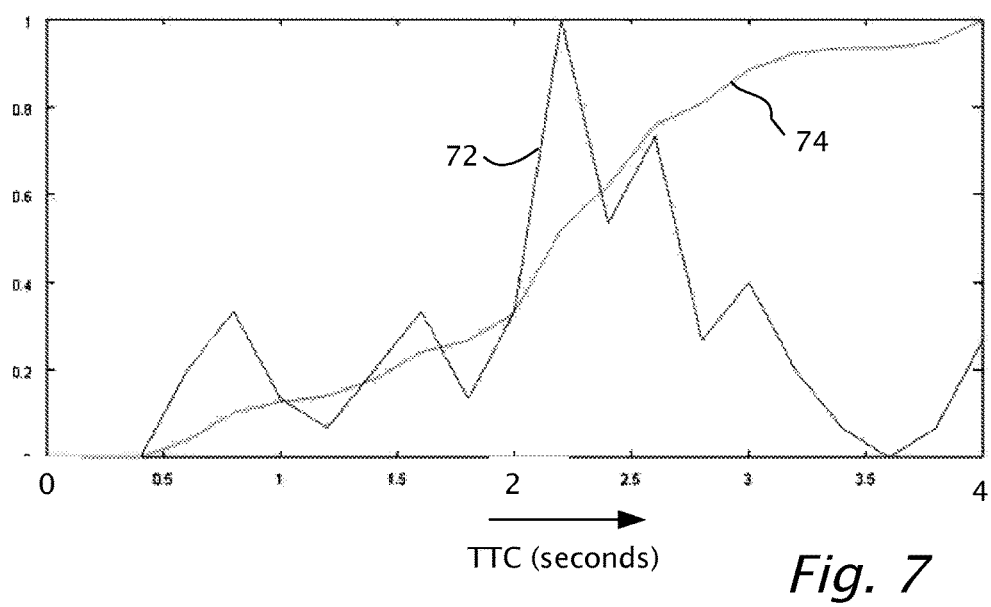
FIG. 7 shows a plot of the distribution of time of a Take Over Request (TOR) signal, showing distribution and cumulative curves respectively, according to a feature of the present invention.

FIG. 7 shows the distribution of time of a Take Over Request (TOR) signal for use in a collision mitigation by braking (CMbB) system. Normalized distribution 72 and cumulative 74 are shown. The time-to-contact (TTC) average: 2.37 seconds.

Real World Examples

Figure 8A:
FIG. 8a shows an example of a lead vehicle at the right edge of the image with only one taillight.

FIG. 8a shows an example of a lead vehicle 40 at the right edge of the image frame with only one taillight 42. Methods 301 and 501, according to feature of the present invention, were run on over 20 thousand prerecorded night clips which represent about 350 hours of driving. There were many examples where the target or lead vehicle 40 vehicle had only one taillight and some where the standard vehicle detection failed to detect the target vehicle and the spot based time-to-contact (TTC). Methods 301 and 501 worked well. In addition, 60 motorcycles were correctly detected using methods 301 and 501.

Figure 8B:
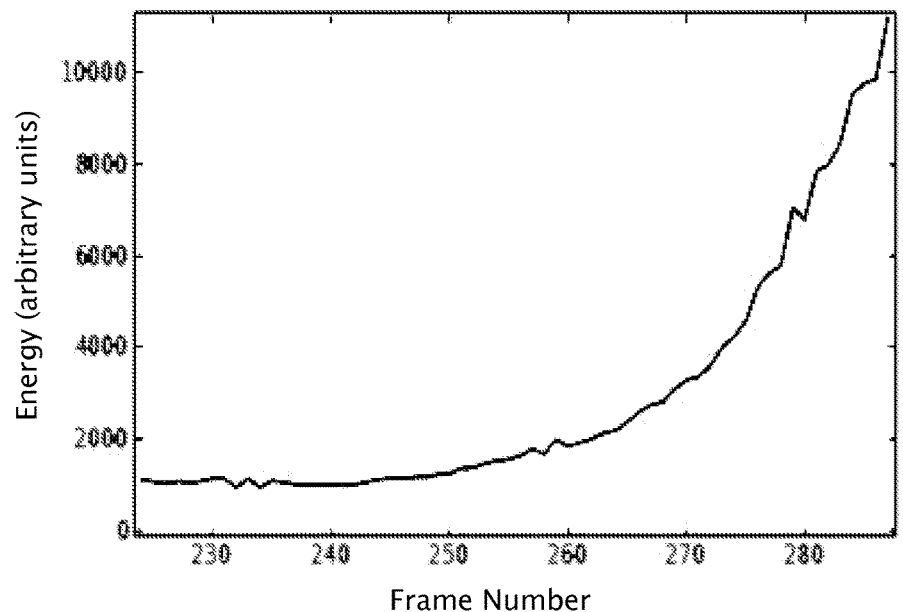
Figure 8C:
FIGS. 8c and 8d show the inverse of the square root of energy (e), as a function of frame number, where time-to-contact (TTC) is computed for the spot from the taillight of lead vehicle.
Figure 8D:
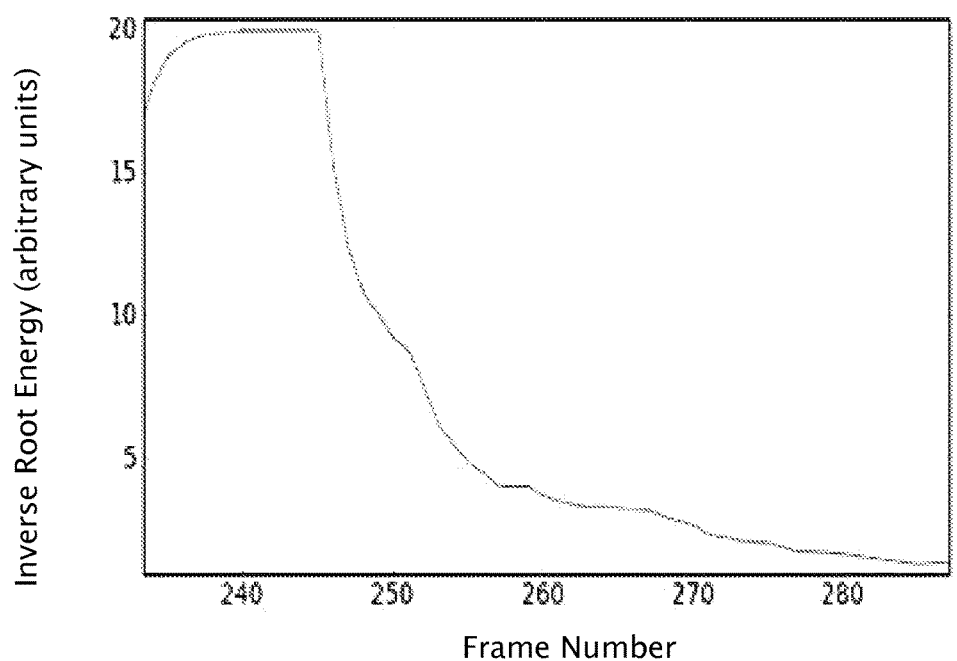

FIG. 8b shows a graph of energy (e) as a function of frame number, where time-to-contact (TTC) is computed for the left spot 42 on lead vehicle 40. FIGS. 8c and 8d show a graph of the inverse of the square root of energy (e) as a function of frame number where time-to-contact (TTC) is computed for a single taillight spot 42 on lead vehicle 40 as shown in FIG. 8a.

Figure 9:
FIG. 9 shows stationary light spots on a curved tunnel wall.

There were 35 false time-to-contact (TTC) warnings giving a Mean Time Between Failure (MTBF) of 10 hours. Of these, 13 were stationary light spots on a curved tunnel wall as shown in FIG. 9. The stationary light spots are reflection of the tunnel overhead lights. Eight were small spots/reflector on a leading vehicle, but outside its bounding rectangle. Two were reflections on the road and two on reflectors on poles on the side of the road. Other failures were due to significant host vehicle 18 yaw and vehicles at the image boundary.

Figure 10A:
FIG. 10a shows a plot of energy (e) as a function of frame number, with the effects of the light sources of the tunnel overhead lights, according to a feature of the present invention.
Figure 10B:
FIGS. 10b and 10c show respectively the inverse of the square root of energy (e) as a function of frame number, where time-to-contact (TTC) is computed with the effects of the AC light sources of the tunnel overhead lights and with the effects removed, both according to a feature of the present invention.

As shown in FIGS. 10a and 10b, the AC light sources of the tunnel overhead lights can be filtered out by noticing the known fluctuations in energy due to the AC power source.

Figure 10C:

FIG. 10a shows energy (e) with the effects of the AC light sources of the tunnel overhead lights. FIGS. 10b and 10c show the inverse of the square root of energy (e) where time-to-contact (TTC) is computed with and without the effects of the AC light sources of the tunnel overhead lights respectively.

Combination with Other Driver Assistance Systems

Combination with Stereo

Consider a classic two camera stereo system with a focal length of f=950 pixels and a baseline b=0.2 m. Approaching a single light target with a closing speed of 60 km/h. A time-to-contact (TTC) of 2.5 seconds would be at a distance Z=41 meters. At that distance the stereo disparity d, would be:

$$d = \frac{fb}{Z} = \frac{950 * 0.2}{41} = 4.6 \text{ pixels} \qquad (11)$$

In order to compute the time-to-contact (TTC) from a classic stereo system, the disparity may be calculated at multiple time steps. The change in disparity over time gives an estimate of the time-to-contact (TTC). Alternatively, disparity may be converted to distance and reason in metric space. In any case, the change in disparity over 0.25 secs will be about 1/10 of the value d computed above or about 0.46 pixels. Given the slight differences between cameras it may be often difficult to determine stereo disparity on a spot with the required accuracy.

A solution is to apply the time-to-contact (TTC) from method 301 to each spot where the disparity indicates a distance below v×T, where v is the host vehicle 18 velocity and T is some time threshold such as T=2.5 sec.

The time-to-contact (TTC) method 301 can be applied to one camera 12, to both cameras 12 individually or to both cameras 12 together, summing up the energy from the corresponding spot 42 in the left and right images.

Combination with Radar

The radar system gives accurate range and range rate information using a Doppler shift. Computing time-to-contact (TTC) from radar range and range rate of change is straightforward. However, the angular resolution of the radar may be poor and thus the lateral distance accuracy is weak. It may be advantageous to combine radar information with camera 12 information. A key task is matching radar targets and vision targets. Matching may be performed using various known techniques based on angle or based on angle plus range.

Time-to-contact (TTC) from spots 42 information enables matching using angle and time-to-contact (TTC). Both radar and vision system 16 provide a list of targets with angle and time-to-contact (TTC) value.

1. For each radar target find all vision targets that are within a given angular range.

2. Find the vision target that maximizes:

$$M = \alpha e^{\frac{-(\theta_r - \theta_v)^2}{\sigma_\theta}} + \beta e^{\frac{-(TTC_r - TTC_v)^2}{\sigma_{TTC}}}$$

where: $\sigma$ is the angle of the target found by radar, $\theta_v$ is the angle of the target found by vision, $TTC_r$ is the time-to-contact from radar, $TTC_v$ is the time-to-contact from spots.

$\sigma_\theta$, $\sigma_{TTC}$ are standard deviations of the difference in angle and time-to-contact as calculated respectively using radar and vision. $\alpha$ and $\beta$ are weight constants.

After matching, the more accurate vision angle can be combined with the accurate radar range and time-to-contact (TTC) to provide improved collision course detection and forward collision warning (FCW) 22 using brightness of spots or to provide collision mitigation by braking (CMbB) 21.

Combination with Lidar

The Lidar system typically provides better angular resolution than radar and provides an accurate range but does not provide range rate directly. Range rate may be provided by differentiating distance to target Z. The same algorithm can be used as for radar for matching using angle but with different weight constants. Following the matching, the time-to-contact (TTC) values from Lidar and vision can be combined.

The term "inlier" as used herein is in the context of the estimation of parameters of a mathematical model from a set of observed data. Data whose distribution can be explained by some set of the mathematical model parameters are known as "inliers" as opposed to "outliers" which are data which does not fit the mathematical model parameters.

The term "energy" as used herein for an imaged spot of a light source in real space is proportional to the sum of the grey scale or color intensity values of the picture elements (pixels) of the imaged spot. The term "pixel value" refers to the grey scale and/or color intensity value of the picture element.

The indefinite articles "a", "an" is used herein, such as "a light source", "a spot" have the meaning of "one or more" that is "one or more light sources" or "one or more spots".

Although selected features of the present invention have been shown and described, it is to be understood the present invention is not limited to the described features. Instead, it is to be appreciated that changes may be made to these features and combinations between the various embodiments without departing from the principles and spirit of the invention, the scope of which is defined by the claims and the equivalents thereof.

What is claimed is:

1. A method of computing a time-to-contact (TTC) of a vehicle with an object in an environment of the vehicle, wherein the object includes a light source, the method performable by a camera connectible to a processor on-board the vehicle, the method comprising:
    capturing, via the camera, a plurality of images of the object;
    tracking, by the processor, a spot identified in at least two of the plurality of images, wherein the tracked spot includes light emanating from a light source of another vehicle;
    determining, by the processor, a change in brightness of the tracked spot based on a change in respective pixel values of the tracked spot in the at least two of the plurality of images;
    determining, by the processor, a change in computed energy of the tracked spot based on a change in aggregate pixel values in at least one image of the at least two of the plurality of images; and
    computing, by the processor, the time-to-contact based on the change in brightness of the tracked spot and the change in computed energy of the tracked spot.

2. The method according to claim 1, wherein the energy is computed by summing pixel values from a plurality of pixels of the tracked spot.

3. The method according to claim 1, further comprising:
    fitting a function of the energy to a function of the time-to-contact.

4. The method of claim 3, wherein a reciprocal of a square root of the energy is fit to a linear function of the time-to-contact.

5. The method according to claim 1, further comprising:
    determining whether the vehicle and the object are on a collision course responsive to detecting motion of the tracked spot in the plurality of images.

6. The method of claim 5, wherein determining whether the vehicle and the object are on a collision course includes a determination with respect to an amount of time before the spot moves a predetermined vertical distance in the plurality of images as compared to an amount of time before the spot moves a predetermined horizontal distance in the plurality of images.

7. The method of claim 1, wherein the energy is computed from a predicted spot intensity based on non-saturated pixels at an edge of the tracked spot.

8. The method of claim 1, wherein the change in the energy over time is determined based on a single frame value, wherein the single frame value is calculated from a histogram of energy changes between a current compared image frame and multiple previous image frames, and wherein the energy changes are weighted in the histogram based on a relative lapse in time between the current compared image frame and the multiple previous image frames.

9. The method of claim 8, wherein the change in the energy over time is determined based on a weighted sum of a current single frame value and a plurality of prior single frame values calculated from a plurality of prior current compared image frames.

10. The method of claim 1, wherein tracking the spot identified in at least two of the plurality of images includes determining whether fluctuations in energy for the tracked spot between images correspond to known fluctuations associated with a known type of light source.

11. A system for computing a time-to-contact (TTC) of a vehicle with an object in an environment of the vehicle, wherein the object includes a light source, the system mountable in the vehicle, the system comprising:

a camera; and a processor configured to:

capture from the camera a plurality of images of the object;

track a spot identified in at least two of the plurality of images, wherein the tracked spot includes light emanating from a light source of another vehicle;

determine a change in brightness of the tracked spot based on a change in respective pixel values of the tracked spot in the at least two of the plurality of images;

determine a change in computed energy of the tracked spot based on a change in aggregate pixel values in at least one image of the at least two of the plurality of images; and compute the time-to-contact (TTC) based on the change in brightness of the tracked spot and the change in computed energy of the tracked spot.

12. The system according to claim 11, wherein the energy is computed by summing pixel values from a plurality of pixels of the tracked spot.

13. The system according to claim 11, wherein the processor is further configured to:

fit a function of the energy to a function of the time.

14. The system according to claim 11, wherein the camera is a camera from a stereo pair of cameras.

15. The system according to claim 11, wherein the time-to-contact is computed from a sensor input to the processor from a combination of the camera with a radar system.

16. The system according to claim 11, wherein the time-to-contact is computed from a sensor input to the processor from a combination of the camera with a lidar system.

* * * * *

UNITED STATES PATENT AND TRADEMARK OFFICE
CERTIFICATE OF CORRECTION

PATENT NO. : 10,860,869 B2  
APPLICATION NO. : 14/378798  
DATED : December 8, 2020  
INVENTOR(S) : Dagan et al.

Page 1 of 1

It is certified that error appears in the above-identified patent and that said Letters Patent is hereby corrected as shown below:

On the Title Page

Item (71), "Applicants: Erez Dagan, Tel Aviv (IL) and Mobileye Vision Technologies Ltd, Jerusalem (IL)", should read --Applicant: Mobileye Vision Technologies Ltd, Jerusalem (IL)--.

Signed and Sealed this
Nineteenth Day of January, 2021

Andrei Iancu
*Director of the United States Patent and Trademark Office*